United States Patent
Lee et al.

(10) Patent No.: US 10,509,936 B2
(45) Date of Patent: Dec. 17, 2019

(54) FINGERPRINT IDENTIFICATION APPARATUS HAVING CONDUCTIVE STRUCTURE

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW); Chia-Hsun Tu, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 135 days.

(21) Appl. No.: 15/687,544

(22) Filed: Aug. 28, 2017

(65) Prior Publication Data

US 2019/0065804 A1   Feb. 28, 2019

(51) Int. Cl.
*G06K 9/00* (2006.01)
*G06K 9/22* (2006.01)

(52) U.S. Cl.
CPC ............ *G06K 9/0002* (2013.01); *G06K 9/22* (2013.01); *G06K 9/00053* (2013.01)

(58) Field of Classification Search
CPC .................. G06K 9/0002; G06K 9/00053
See application file for complete search history.

(56) References Cited

U.S. PATENT DOCUMENTS

| | | | |
|---|---|---|---|
| 2014/0103943 A1* | 4/2014 | Dunlap | G01N 27/221 324/663 |
| 2016/0210495 A1* | 7/2016 | Jagemalm | H01L 24/49 |
| 2017/0092622 A1* | 3/2017 | Wu | H01L 24/82 |
| 2017/0147852 A1* | 5/2017 | Benkley, III | H01L 23/5387 |
| 2018/0174018 A1* | 6/2018 | Lundberg | G06K 19/145 |

\* cited by examiner

*Primary Examiner* — Utpal D Shah
(74) *Attorney, Agent, or Firm* — Chun-Ming Shih; HDLS IPR Services

(57) ABSTRACT

A fingerprint identification apparatus having a conductive structure includes an insulated casing, a conductive wire, and a fingerprint identification module. The insulated casing has a first surface with a fingerprint detection region and a second surface. The conductive wire has a first wire segment and a second wire segment. The first wire segment forms on the first surface and contacts with the fingerprint detection region. The second wire segment forms on the second surface and electrically connects to the first wire segment. The fingerprint identification module is disposed on the second surface and electrically connected to the second wire segment. Therefore, the conductive structure for fingerprint identification is provided to increase accuracy and security of the fingerprint identification and reduce manufacturing costs.

16 Claims, 9 Drawing Sheets

FINGERPRINT IDENTIFICATION APPARATUS HAVING CONDUCTIVE STRUCTURE

BACKGROUND

Technical Field

The present invention relates to a fingerprint identification apparatus, and more particularly to a fingerprint identification apparatus having a conductive structure.

Description of Related Art

Biometric recognition technologies have rapid development due to the strong request from electronic security applications and automatic access control system in e-commerce and mobile payment. The biometric recognition technologies can be classified into fingerprint recognition, iris recognition, DNA recognition and so on. For the considerations of efficiency, safety and non-invasiveness, the fingerprint recognition becomes main stream technology. The fingerprint recognition device can scan fingerprint image by optical scanning, thermal imaging or capacitive imaging. For cost, power-saving, reliability and security concerns, the capacitive fingerprint sensor becomes popular for biometric recognition technology applied to portable electronic apparatuses.

Integrating the fingerprint identification function into a personal mobile apparatus, such as a cell phone, a tablet computer, or a smart watch is an irreversible trend. In general, an hole is opened or dug into the protective glass, such as the cover glass of the personal mobile apparatus for embedding a fingerprint identification module. Afterward, a metal conductive ring of the fingerprint identification module is used to transmit high-frequency signals to a user's finger touching on the metal conductive ring and sensing electrodes of the fingerprint identification module are used to actively receive the high-frequency signals. However, the above-mentioned technology is unfavorable for designs of waterproof and shockproof of the personal mobile apparatuses as well as is cumbersome, difficult, and high-cost to manufacture the personal mobile apparatuses.

Accordingly, the present invention provides a fingerprint identification apparatus having a conductive structure to arrange a conductive wire on the surface of the cover of the electronic apparatus without needing to open/dig a hole for embedding the fingerprint identification module so as to achieve the function of fingerprint identification, increase the correctness and security of fingerprint identification, and reduce manufacturing costs.

SUMMARY

An objective of the present invention is to provide a fingerprint identification apparatus having a conductive structure to solve problems of unfavorable designs of waterproof and shockproof of the personal mobile apparatuses as well as cumbersome, difficult, and high-cost to manufacture the personal mobile apparatuses since the hole is opened or dug into the protective glass of the personal mobile apparatus for embedding the fingerprint identification module.

In order to achieve the above-mentioned objective, the fingerprint identification apparatus having the conductive structure includes an insulated casing, a conductive wire, and a fingerprint identification module. The insulated casing includes a first surface and a second surface. The first surface has a fingerprint detection region. The second surface is opposite to the first surface. The conductive wire includes a first wire segment and a second wire segment. The first wire segment is disposed on the first surface and in contact with the fingerprint detection region. The second wire segment is disposed on the second surface and electrically connected to the first wire segment. The fingerprint identification module is disposed on the second surface and electrically connected to the second wire segment.

In one embodiment, the insulated casing is a glass casing or a transparent polymer casing, and the conductive wire is a transparent conductive wire.

In one embodiment, the first wire segment is arranged around an outer edge or an inner edge of the fingerprint detection region.

In one embodiment, the fingerprint identification apparatus further includes at least one conductive member. The conductive member is arranged between the first surface and the second surface of the insulated casing and electrically connected to the first wire segment and the second wire segment of the conductive wire.

In one embodiment, the at least one conductive member is a metal frame.

In one embodiment, the at least one conductive member is a conductive rubber or a conductive adhesive.

In one embodiment, the fingerprint identification apparatus further includes at least one through hole and a conductive material. The at least one through hole is formed between the first surface and the second surface of the insulated casing. The conductive material is filled in the at least one through hole and electrically connected to the first wire segment and the second wire segment of the conductive wire.

In one embodiment, the fingerprint identification apparatus further includes a fingerprint identification integrated circuit. The fingerprint identification integrated circuit has a reference potential contact, and the reference potential contact is electrically connected to the second wire segment.

In one embodiment, the reference potential contact is a zero potential contact of the fingerprint identification integrated circuit or a predetermined direct-current voltage output point.

In one embodiment, the fingerprint identification module includes a fingerprint identification integrated circuit and a plurality of sensing electrodes. The fingerprint identification integrated circuit provides a fingerprint detection signal, and the fingerprint detection signal is transmitted to a finger touching on the fingerprint detection region through the second wire segment and the first wire segment to produce a fingerprint signal from the finger; the fingerprint signal is sensed by the plurality of sensing electrodes.

In one embodiment, the fingerprint identification module includes a fingerprint identification integrated circuit having a plurality of sensing electrodes. The fingerprint identification integrated circuit provides a fingerprint detection signal, and the fingerprint detection signal is transmitted to a finger touching on the fingerprint detection region through the second wire segment and the first wire segment to produce a fingerprint signal from the finger; the fingerprint signal is sensed by the plurality of sensing electrodes of the fingerprint identification integrated circuit.

In one embodiment, the fingerprint identification module includes a fingerprint identification integrated circuit having a static electricity elimination circuit. The static electricity elimination circuit is electrically connected to the second wire segment.

In one embodiment, the fingerprint identification module is a capacitive fingerprint identification module.

In one embodiment, the fingerprint identification module includes a plurality of sensing electrodes placed on a glass substrate or a polymer substrate.

In one embodiment, the glass substrate or the polymer substrate is the insulated casing.

In one embodiment, the insulated casing is an upper cover or a lower cover of an electronic apparatus.

Accordingly, the fingerprint identification apparatus having the conductive structure is provided to achieve the function of fingerprint identification, increase the correctness and security of fingerprint identification, and reduce manufacturing costs.

It is to be understood that both the foregoing general description and the following detailed description are exemplary, and are intended to provide further explanation of the present invention as claimed. Other advantages and features of the present invention will be apparent from the following description, drawings and claims.

BRIEF DESCRIPTION OF DRAWING

The present invention can be more fully understood by reading the following detailed description of the embodiment, with reference made to the accompanying drawings as follows.

DETAILED DESCRIPTION

Figure 1:
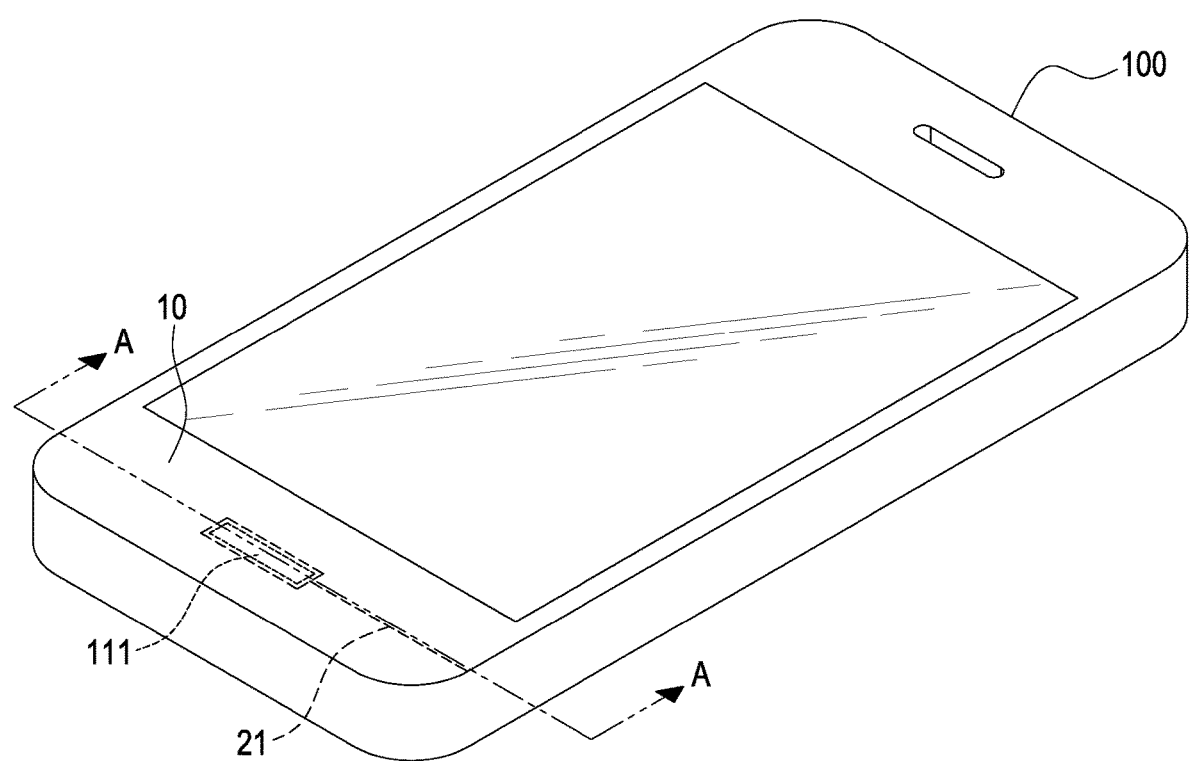
FIG. 1 is a perspective view of an electronic apparatus according to the present invention.

Reference will now be made to the drawing figures to describe the present invention in detail. It will be understood that the drawing figures and exemplified embodiments of present invention are not limited to the details thereof.

Refer to FIG. 1, which shows a perspective view of an electronic apparatus according to the present invention. The electronic apparatus 100 may be, for example but not limited to, a portable electronic apparatus, such as a smart phone, a tablet computer, a laptop computer, or a personal digital assistant (PDA). Also, the electronic apparatus 100 may be, for example but not limited to, a wearable electronic apparatus, such as a smart watch. In other words, all electronic apparatuses which can be used for fingerprint identification would be intended to be embraced within the scope of the present invention. For convenience, a smart phone is exemplified to further demonstrate the present invention.

Figure 2:
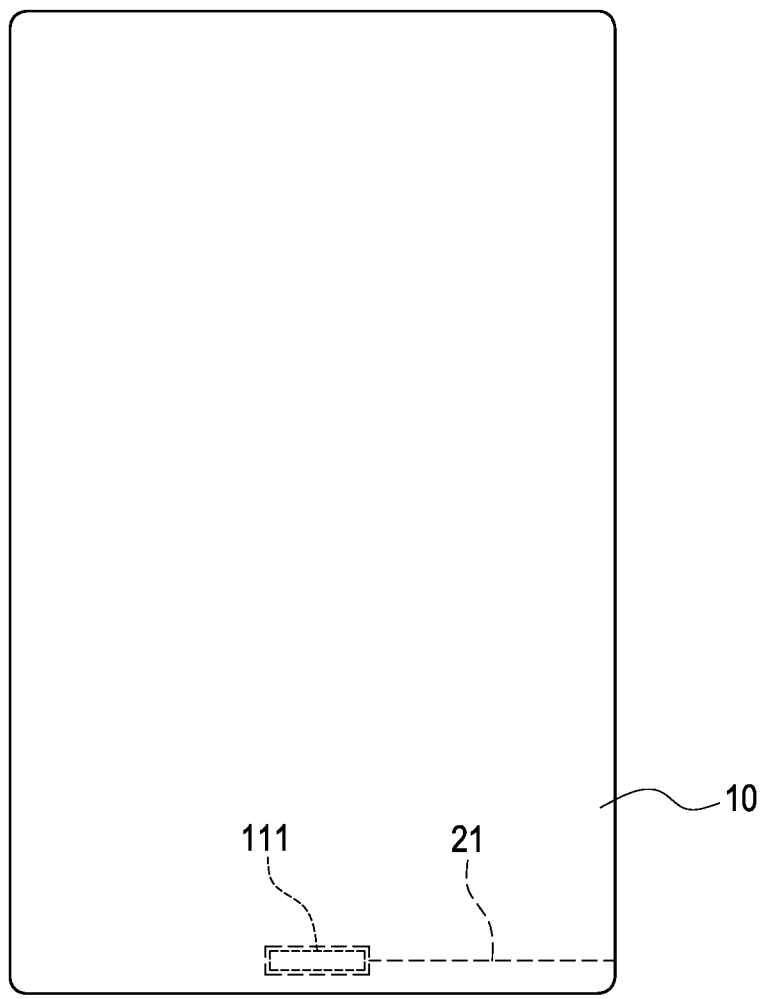
FIG. 2 is a rear plan view of the electronic apparatus according to the present invention.
Figure 3:
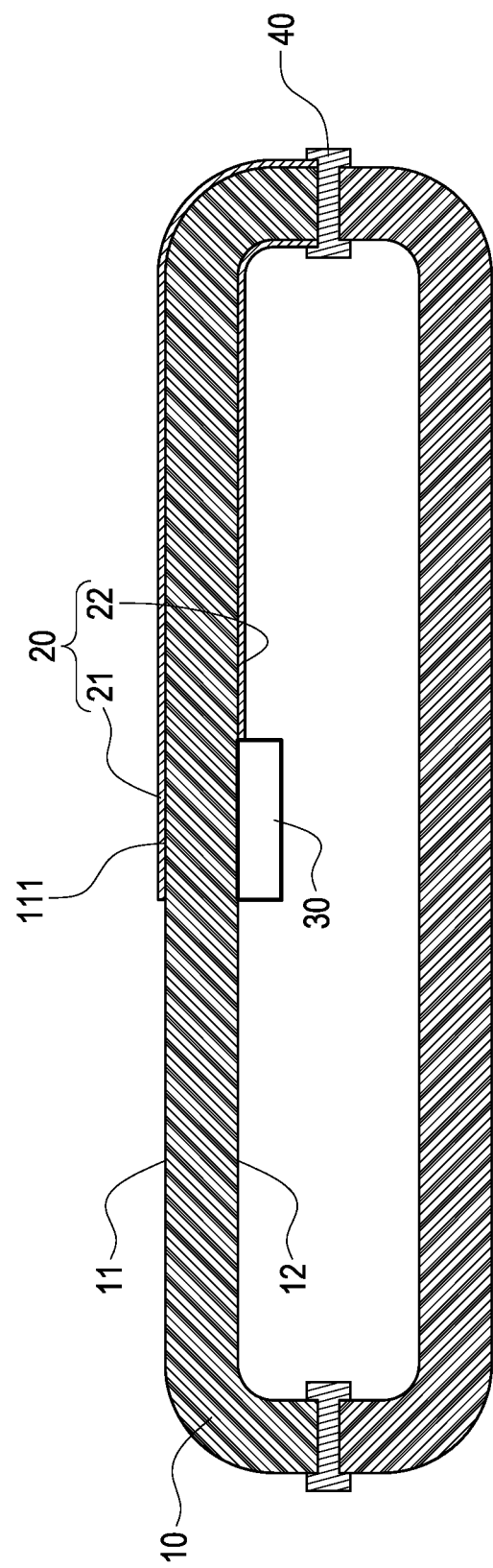
FIG. 3 is a schematic cross sectional view of a fingerprint identification apparatus having a conductive structure according to a first embodiment of the present invention.

Refer to FIG. 2 and FIG. 3. FIG. 2 shows a rear plan view of the electronic apparatus according to the present invention; FIG. 3 shows a schematic cross sectional view (along line A-A in FIG. 1) of a fingerprint identification apparatus having a conductive structure according to a first embodiment of the present invention. The fingerprint identification apparatus having the conductive structure (hereinafter referred to as "fingerprint identification apparatus") includes an insulated casing 10, a conductive wire 20, and a fingerprint identification module 30. The insulated casing 10 may be an upper cover (also referred to as "upper casing") or a lower cover (also referred to as "lower casing") of the electronic apparatus 100. The so-called upper and lower directions are respectively defined as a front and rear directions when a user operates the electronic apparatus 100. The insulated casing 10 may be a glass casing or a transparent polymer casing.

In the first embodiment shown in FIG. 3, the insulated casing 10 is the upper cover of the electronic apparatus 100, and the insulated casing 10 has a first surface 11 and a second surface 12. The first surface 11 is an outer surface of the insulated casing 10 (namely the upper cover) and the first surface 11 has a fingerprint detection region thereon. The second surface 12 is opposite to the first surface 11, namely an inner surface of the insulated casing 10.

Figure 4A:
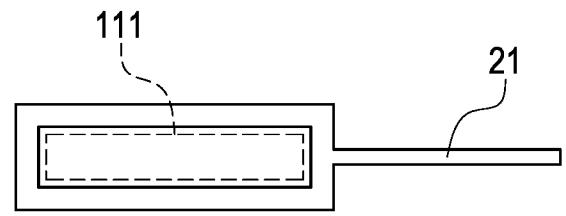
FIG. 4A is a schematic top view of a conductive wire and a fingerprint detection region according to a first embodiment of the present invention.
Figure 4B:
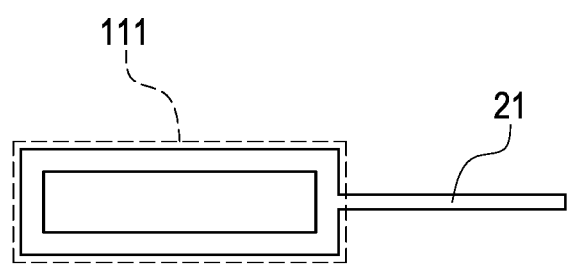
FIG. 4B is a schematic top view of the conductive wire and the fingerprint detection region according to a second embodiment of the present invention.

The conductive wire 20 has a first wire segment 21 and a second wire segment 22, wherein the conductive wire 20 is a transparent conductive wire. The first wire segment 21 is disposed or formed on the first surface 11 and in contact with the fingerprint detection region 111. The second wire segment 22 is disposed or formed on the second surface 12 and electrically connected to the first wire segment 21. More specifically, the first wire segment 21 may be arranged around an outer edge or an inner edge of the fingerprint detection region 111. As shown in FIG. 4A, the first wire segment 21 may be bent and arranged around the outer edge of the fingerprint detection region 111. As shown in FIG. 4B, the first wire segment 21 may be bent and arranged around the inner edge of the fingerprint detection region 111. However, it is not limited to the above-mentioned positions shown in FIG. 4A and FIG. 4B. In other words, the first wire segment 21 may be arranged inside the fingerprint detection region 111.

In order to make it manifest that the first wire segment 21 and the second wire segment 22 are respectively disposed or formed on the first surface 11 and the second surface 12, the first wire segment 21 and the second wire segment 22 are highlighted and not drawn to scale.

In the first embodiment shown in FIG. 3, the fingerprint identification apparatus further includes at least one conductive member 40. The at least one conductive member 40 may be a metal frame, a conductive rubber, or a conductive adhesive. The at least one conductive member 40 is arranged between the first surface 11 and the second surface 12 of the insulated casing 10 and electrically connected to the first wire segment 21 and the second wire segment 22 of the conductive wire 20. The at least one conductive member 40 may be firmly arranged between the first surface 11 and the second surface 12 by tightly covering the upper cover and the lower cover of the electronic apparatus 100 together. Alternatively, the at least one conductive member 40 may be directly attached on the upper cover to be firmly arranged between the first surface 11 and the second surface 12. However, it is not limited to the above-mentioned arrangements shown in FIG. 3 as long as the at least one conductive member 40 can be firmly arranged between the first surface 11 and the second surface 12.

As shown in FIG. 3, the number of the at least one conductive member 40 is two, that is, two conductive members 40 are respectively arranged at two sides of the electronic apparatus 100 so as to facilitate a symmetrical mold design and a close fit design of the upper cover and the lower cover. Moreover, the number of the at least one conductive member 40 is may be one, that is, only one conductive member 40 is optionally arranged at one side of the electronic apparatus 100 to match with the first wire segment 21 and the second wire segment 22. Also, according to the mold design and the close fit design of the upper cover and the lower cover, the at least one conductive member 40 may be firmly arranged between the first surface 11 and the second surface 12 by tightly covering the upper cover and the lower cover of the electronic apparatus 100 together. Accordingly, the at least one conductive member 40 arranged between the first wire segment 21 and the second wire segment 22 is used to provide an electrical connection between the first wire segment 21 and the second wire segment 22.

In order to make it manifest that the first wire segment 21 and the second wire segment 22 are electrically connected to each other by the at least one conductive member 40, the at least one conductive member 40 is highlighted and not drawn to scale.

The fingerprint identification module 30 is disposed on the second surface 12 and electrically connected to the second wire segment 22. As shown in FIG. 3, the fingerprint identification module 30 is disposed on the inner surface of the upper cover, and the fingerprint identification module 30 is electrically connected to the first wire segment 21 through the second wire segment 22 and the at least one conductive member 40. The detailed description of the fingerprint identification module 30 will be made hereinafter.

Figure 5:
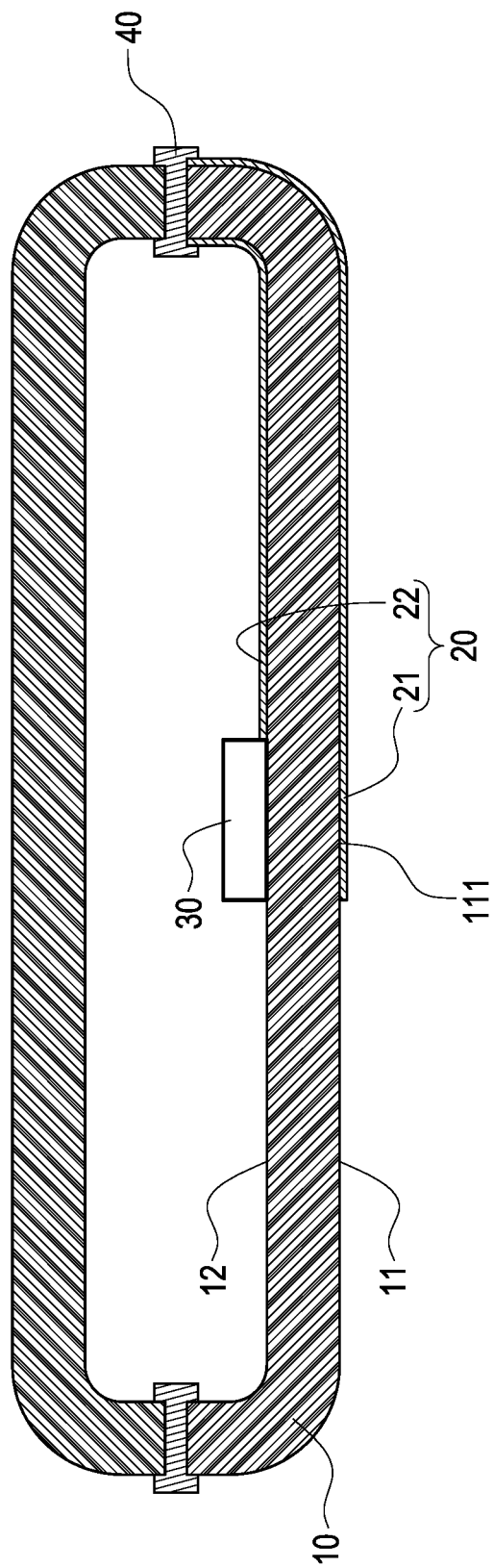
FIG. 5 is a schematic cross sectional view of the fingerprint identification apparatus having the conductive structure according to a second embodiment of the present invention.

Refer to FIG. 5, which shows a schematic cross sectional view (along line A-A in FIG. 1) of the fingerprint identification apparatus having the conductive structure according to a second embodiment of the present invention. In the second embodiment shown in FIG. 5, the insulated casing 10 is the lower cover of the electronic apparatus 100. The first surface 11 is an outer surface of the insulated casing 10 (namely the lower cover) and the first surface 11 has a fingerprint detection region thereon. The second surface 12 is opposite to the first surface 11, namely an inner surface of the insulated casing 10.

The first wire segment 21 is disposed or formed on the first surface 11 and in contact with the fingerprint detection region 111. The second wire segment 22 is disposed or formed on the second surface 12 and electrically connected to the first wire segment 21.

The fingerprint identification apparatus further includes at least one conductive member 40. The at least one conductive member 40 is arranged between the first surface 11 and the second surface 12 of the insulated casing 10 and electrically connected to the first wire segment 21 and the second wire segment 22 of the conductive wire 20. The at least one conductive member 40 may be firmly arranged between the first surface 11 and the second surface 12 by tightly covering the upper cover and the lower cover of the electronic apparatus 100 together. Alternatively, the at least one conductive member 40 may be directly attached on the lower cover to be firmly arranged between the first surface 11 and the second surface 12. However, it is not limited to the above-mentioned arrangements shown in FIG. 5 as long as the at least one conductive member 40 can be firmly arranged between the first surface 11 and the second surface 12.

The fingerprint identification module 30 is disposed on the second surface 12 and electrically connected to the second wire segment 22. As shown in FIG. 5, the fingerprint identification module 30 is disposed on the inner surface of the lower cover, and the fingerprint identification module 30 is electrically connected to the first wire segment 21 through the second wire segment 22 and the at least one conductive member 40. The detailed description of the fingerprint identification module 30 will be made hereinafter.

Figure 6:
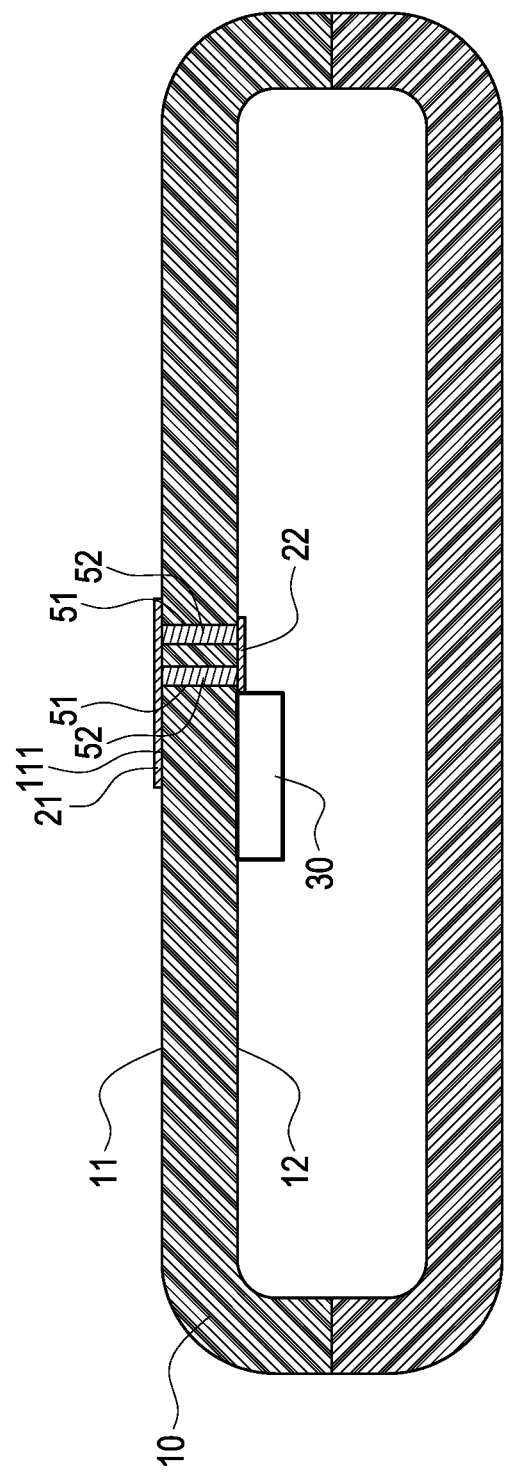
FIG. 6 is a schematic cross sectional view of the fingerprint identification apparatus having the conductive structure according to a third embodiment of the present invention.

Refer to FIG. 6, which shows a schematic cross sectional view (along line A-A in FIG. 1) of the fingerprint identification apparatus having the conductive structure according to a third embodiment of the present invention. In the third embodiment shown in FIG. 6, the insulated casing 10 is the upper cover of the electronic apparatus 100, and the insulated casing 10 has a first surface 11 and a second surface 12. The first surface 11 is an outer surface of the insulated casing 10 (namely the upper cover) and the first surface 11 has a fingerprint detection region thereon. The second surface 12 is opposite to the first surface 11, namely an inner surface of the insulated casing 10.

The conductive wire 20 has a first wire segment 21 and a second wire segment 22, wherein the conductive wire 20 is a transparent conductive wire. The first wire segment 21 is disposed or formed on the first surface 11 and in contact with the fingerprint detection region 111. The second wire segment 22 is disposed or formed on the second surface 12 and electrically connected to the first wire segment 21. More specifically, the first wire segment 21 may be arranged around an outer edge or an inner edge of the fingerprint detection region 111. However, it is not limited to the above-mentioned positions shown in FIG. 4A and FIG. 4B. In other words, the first wire segment 21 may be arranged inside the fingerprint detection region 111.

In the third embodiment shown in FIG. 6, the fingerprint identification apparatus further includes at least one through hole 51 and a conductive material 52. The at least one through hole 51 is formed between the first surface 11 and the second surface 12. The at least one through hole 51 is a micro-hole structure, and it means that a diameter of the at least one through hole 51 is micro-sized. As shown in FIG. 6, the at least one through hole 51 penetrates through the upper cover and is formed between the first surface 11 and the second surface 12. The conductive material 52 is filled in the at least one through hole 51 to form a conductive micro-pillar structure so that the first wire segment 21 and the second wire segment 22 are electrically connected to each other by the conductive micro-pillar structure. In this embodiment, the first wire segment 21 and the second wire segment 22 may be only disposed or formed on the portions of the first surface 11 and the second surface 12, which are corresponding to the at least one through hole 51, while the first wire segment 21 and the second wire segment 22 do not extend to two sides or any one side of the electronic apparatus 100.

In order to make it manifest that the first wire segment 21 and the second wire segment 22 are electrically connected to each other by the conductive micro-pillar structure formed by the at least one through hole 51 and the conductive material 52, the at least one through hole 51 and the conductive material 52 are highlighted and not drawn to scale.

The fingerprint identification module 30 is disposed on the second surface 12 and electrically connected to the second wire segment 22. As shown in FIG. 6, the fingerprint identification module 30 is disposed on the inner surface of the upper cover, and the fingerprint identification module 30 is electrically connected to the first wire segment 21 through the second wire segment 22 and the conductive micro-pillar structure formed by the at least one through hole 51 and the conductive material 52. The detailed description of the fingerprint identification module 30 will be made hereinafter.

Figure 7:
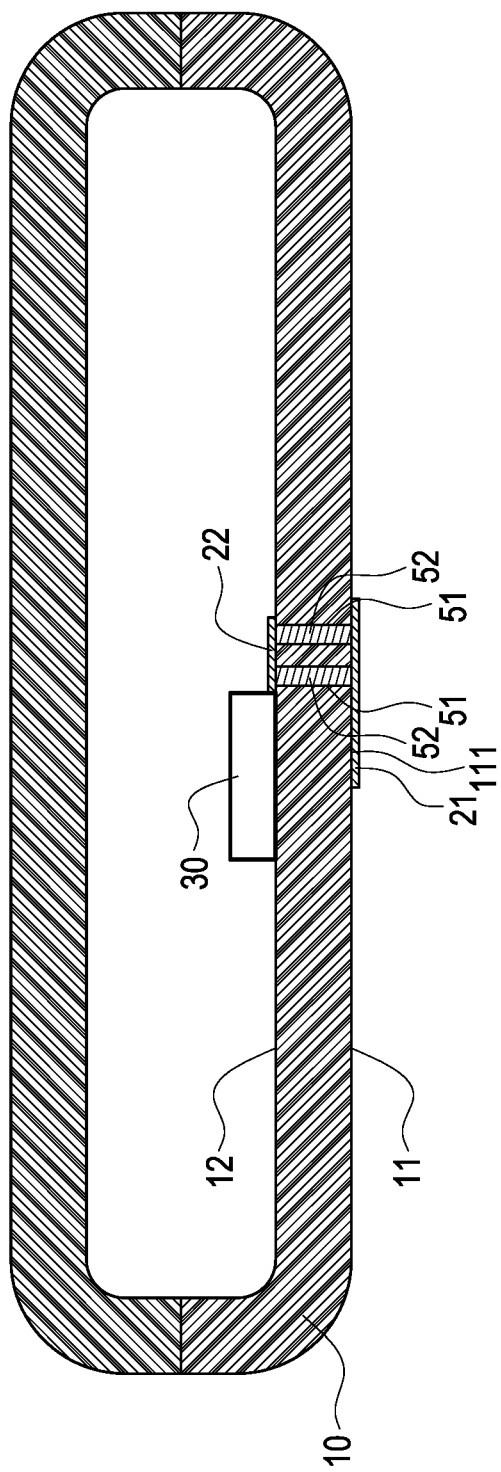
FIG. 7 is a schematic cross sectional view of the fingerprint identification apparatus having the conductive structure according to a fourth embodiment of the present invention.

Refer to FIG. 7, which shows a schematic cross sectional view (along line A-A in FIG. 1) of the fingerprint identification apparatus having the conductive structure according to a fourth embodiment of the present invention. In the fourth embodiment shown in FIG. 7, the insulated casing 10 is the lower cover of the electronic apparatus 100. The first surface 11 is an outer surface of the insulated casing 10 (namely the lower cover) and the first surface 11 has a fingerprint detection region 111 thereon. The second surface 12 is opposite to the first surface 11, namely an inner surface of the insulated casing 10.

The first wire segment 21 is disposed or formed on the first surface 11 and in contact with the fingerprint detection region 111. The second wire segment 22 is disposed or formed on the second surface 12 and electrically connected to the first wire segment 21.

The fingerprint identification apparatus further includes at least one through hole 51 and a conductive material 52. The at least one through hole 51 is formed between the first surface 11 and the second surface 12. The at least one through hole 51 is a micro-hole structure, and it means that a diameter of the at least one through hole 51 is micro-sized. As shown in FIG. 7, the at least one through hole 51 penetrates through the lower cover and is formed between the first surface 11 and the second surface 12. The conductive material 52 is filled in the at least one through hole 51 to form a conductive micro-pillar structure so that the first wire segment 21 and the second wire segment 22 are electrically connected to each other by the conductive micro-pillar structure. In this embodiment, the first wire segment 21 and the second wire segment 22 may be only disposed or formed on the portions of the first surface 11 and the second surface 12, which are corresponding to the at least one through hole 51, while the first wire segment 21 and the second wire segment 22 do not extend to two sides or any one side of the electronic apparatus 100.

The fingerprint identification module 30 is disposed on the second surface 12 and electrically connected to the second wire segment 22. As shown in FIG. 7, the fingerprint identification module 30 is disposed on the inner surface of the lower cover, and the fingerprint identification module 30 is electrically connected to the first wire segment 21 through the second wire segment 22 and the conductive micro-pillar structure formed by the at least one through hole 51 and the conductive material 52. The detailed description of the fingerprint identification module 30 will be made hereinafter.

Figure 8:
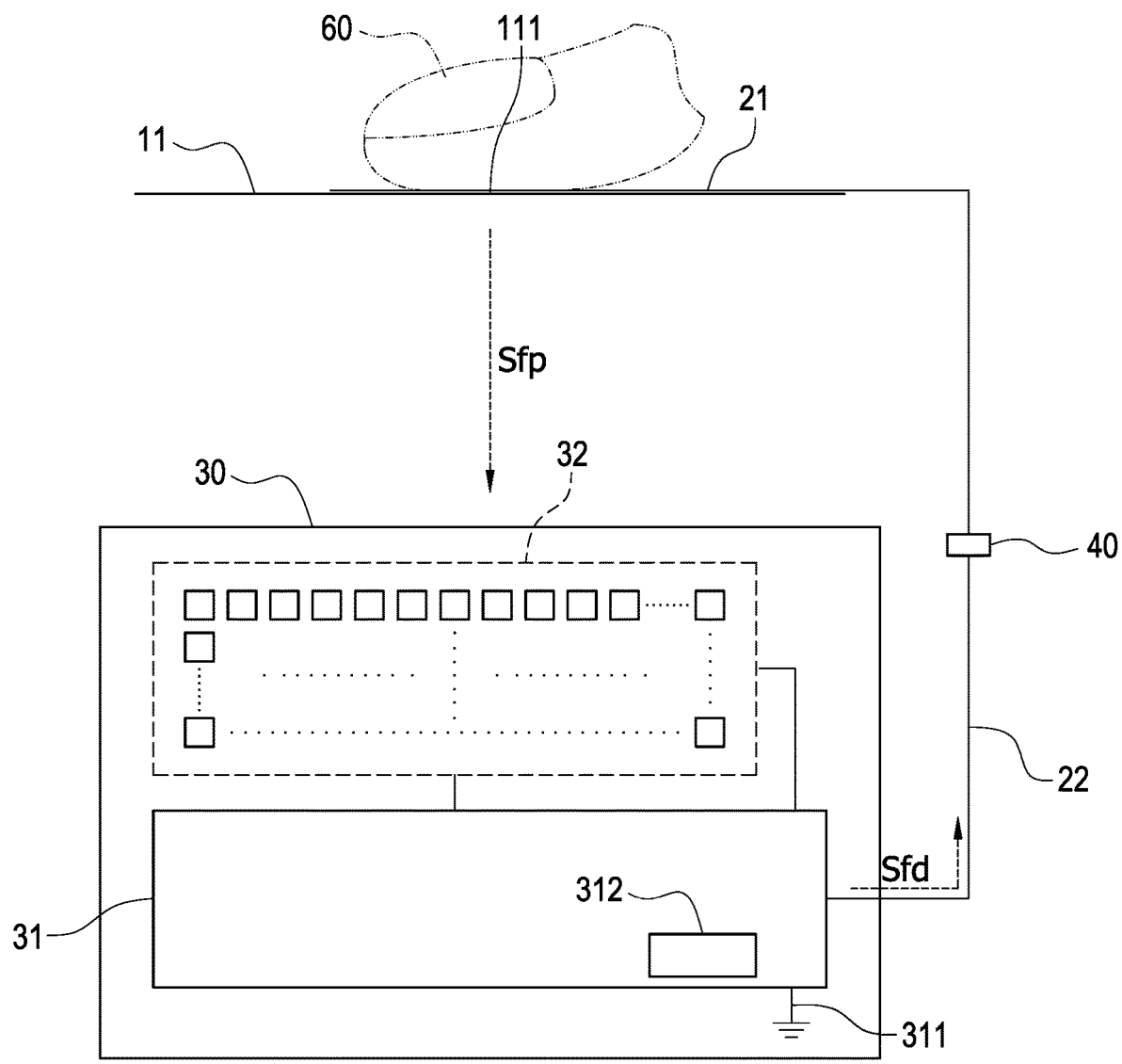
FIG. 8 is a schematic block diagram of a fingerprint identification module according to a first embodiment of the present invention.

Refer to FIG. 8, which shows a schematic block diagram of a fingerprint identification module according to a first embodiment of the present invention. Basically, it is referred to as "off-chip fingerprint sensor". The fingerprint identification module 30 includes a fingerprint identification integrated circuit 31 and a plurality of sensing electrodes 32. The fingerprint identification integrated circuit 31 has a reference potential contact 311, wherein the reference potential contact 311 may be a predetermined direct-current (DC) voltage output point or a zero potential contact of the fingerprint identification integrated circuit 31. The second wire segment 22 is electrically connected to the reference potential contact 311 by the fingerprint identification integrated circuit 31 and further the second wire segment 22 is electrically connected to the first wire segment 21 through the at least one conductive member 40 (as shown in FIG. 3 and FIG. 5) or the conductive micro-pillar structure formed by the at least one through hole 51 and the conductive material 52 (as shown in FIG. 6 and FIG. 7) so that the fingerprint identification integrated circuit 31 is electrically connected to the first wire segment 21.

When a user's finger 60 touches or presses on the fingerprint detection region 111 of the first surface 11 of the insulated casing 10 for performing an fingerprint identification operation, the finger 60 is electrically connected to the fingerprint identification module 30 through the first wire segment 21 and the second wire segment 22 since the finger 60 contacts the first wire segment 21 of the conductive wire 20. At this time, the fingerprint identification integrated circuit 31 of the fingerprint identification module 30 provides a fingerprint detection signal Sfd to activate a fingerprint information detection of the user's finger 60. The fingerprint detection signal Sfd is applied to the finger 60 touching on the fingerprint detection region 111 through the second wire segment 22 and the first wire segment 21 so as to make the finger 60 provide a fingerprint signal Sfp. Afterward, the fingerprint signal Sfp is sensed by the plurality of sensing electrodes 32 of the fingerprint identification module 30. Accordingly, the fingerprint identification module 30 can acquire the fingerprint information of the finger 60. Further, the fingerprint identification module 30 can compare and determine the acquired fingerprint information of the finger 60 with default fingerprint information which may be previously built and stored in the fingerprint identification module 30 to produce a comparison result so as to implement the user identification according to the comparison result.

Figure 9:
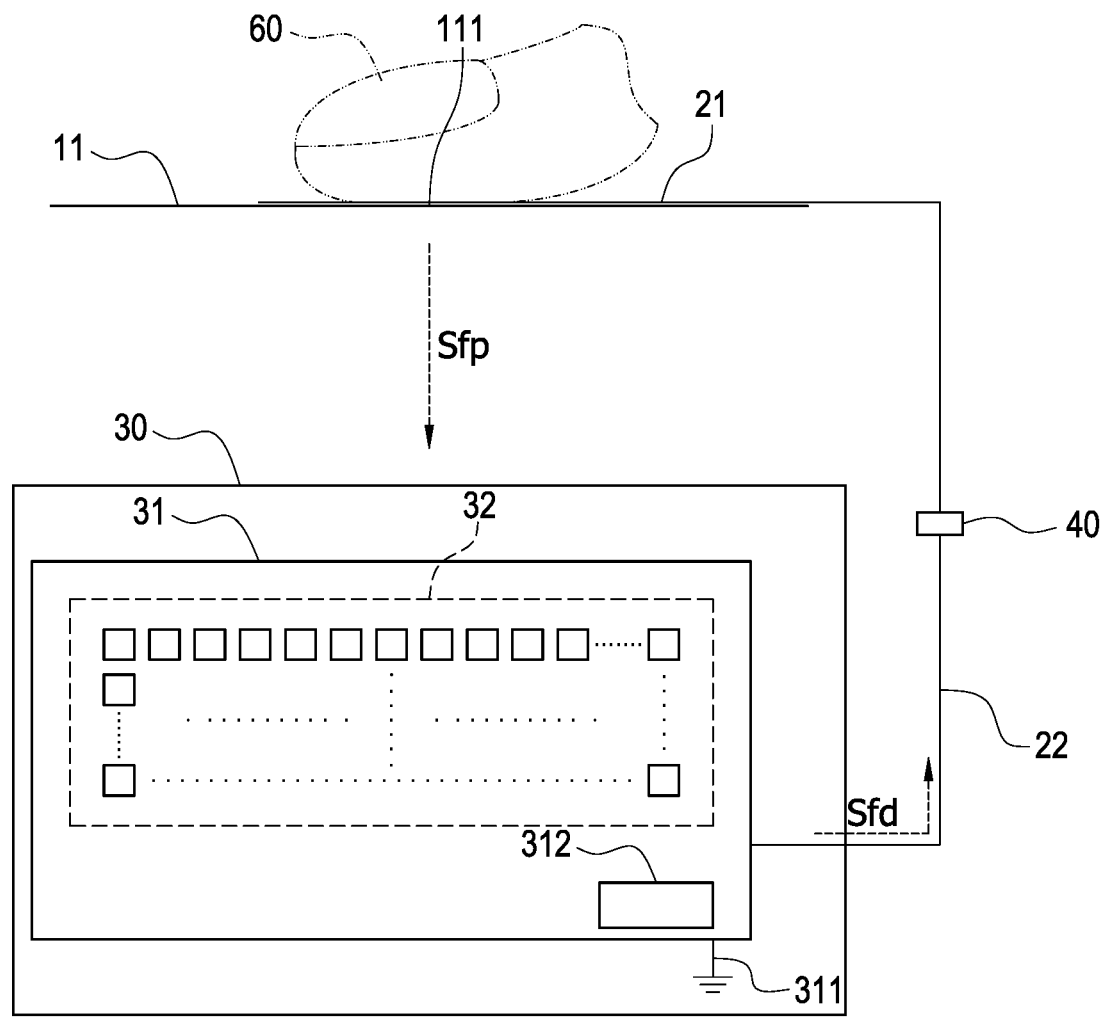
FIG. 9 is a schematic block diagram of the fingerprint identification module according to a second embodiment of the present invention.

Refer to FIG. 9, which shows a schematic block diagram of the fingerprint identification module according to a second embodiment of the present invention. Basically, it is referred to as "on-chip fingerprint sensor". The fingerprint identification module 30 includes a fingerprint identification integrated circuit 31 having a plurality of sensing electrodes 32. The fingerprint identification integrated circuit 31 has a reference potential contact 311, wherein the reference potential contact 311 may be a predetermined direct-current (DC) voltage output point or a zero potential contact of the fingerprint identification integrated circuit 31. The second wire segment 22 is electrically connected to the reference potential contact 311 by the fingerprint identification integrated circuit 31 and further the second wire segment 22 is electrically connected to the first wire segment 21 through the at least one conductive member 40 (as shown in FIG. 3 and FIG. 5) or the conductive micro-pillar structure formed by the at least one through hole 51 and the conductive material 52 (as shown in FIG. 6 and FIG. 7) so that the fingerprint identification integrated circuit 31 is electrically connected to the first wire segment 21.

When the user's finger 60 touches or presses on the fingerprint detection region 111 of the first surface 11 of the insulated casing 10 for performing an fingerprint identification operation, the finger 60 is electrically connected to the fingerprint identification module 30 through the first wire segment 21 and the second wire segment 22 since the finger 60 contacts the first wire segment 21 of the conductive wire 20. At this time, the fingerprint identification integrated circuit 31 of the fingerprint identification module 30 provides a fingerprint detection signal Sfd to activate a fingerprint information detection of the user's finger 60. The fingerprint detection signal Sfd is applied to the finger 60 touching on the fingerprint detection region 111 through the second wire segment 22 and the first wire segment 21 so as to make the finger 60 provide a fingerprint signal Sfp. Afterward, the fingerprint signal Sfp is sensed by the plurality of sensing electrodes 32 of the fingerprint identification integrated circuit 31. Accordingly, the fingerprint identification module 30 can acquire the fingerprint information of the finger 60. Further, the fingerprint identification module 30 can compare and determine the acquired fingerprint information of the finger 60 with default fingerprint information which may be previously built and stored in the fingerprint identification module 30 to produce a comparison result so as to implement the user identification according to the comparison result.

For example, the plurality of sensing electrodes 32 can be physically separated from the fingerprint identification integrated circuit 31 to form the "off-chip fingerprint sensor" structure as shown in FIG. 8. The fingerprint identification module 30 may be, for example but not limited to, a capacitive fingerprint identification module. The capacitive fingerprint identification module has a plurality of sensing electrodes 32, and the plurality of sensing electrodes 32 are placed on a glass substrate or a polymer substrate, wherein the glass substrate or the polymer substrate may be the insulated casing 10 of the electronic apparatus 100. Furthermore, the plurality of sensing electrodes 32 of the fingerprint identification module 30 may be electrically connected to the fingerprint identification integrated circuit 31 by wires to achieve signal transmissions and receptions.

Similarly, when the user's finger 60 touches or presses on the fingerprint detection region 111 of the first surface 11 of the insulated casing 10 for performing an fingerprint identification operation, the finger 60 is electrically connected to the fingerprint identification module 30 through the first wire segment 21 and the second wire segment 22 since the finger 60 contacts the first wire segment 21 of the conductive wire 20. At this time, the fingerprint identification integrated circuit 31 of the fingerprint identification module 30 provides a fingerprint detection signal Sfd to activate a fingerprint information detection of the user's finger 60. The fingerprint detection signal Sfd is applied to the finger 60 touching on the fingerprint detection region 111 through the second wire segment 22 and the first wire segment 21 so as to make the finger 60 provide a fingerprint signal Sfp. Afterward, the fingerprint signal Sfp is sensed by the plurality of sensing electrodes 32 placed on the insulated casing 10. Accordingly, the fingerprint identification module 30 can acquire the fingerprint information of the finger 60. Further, the fingerprint identification module 30 can compare and determine the acquired fingerprint information of the finger 60 with default fingerprint information which may be previously built and stored in the fingerprint identification module 30 to produce a comparison result so as to implement the user identification according to the comparison result.

As shown in FIG. 8 and FIG. 9, the fingerprint identification integrated circuit 31 of the fingerprint identification module 30 further includes a static electricity elimination circuit 312. The static electricity elimination circuit 312 of the fingerprint identification integrated circuit 31 is electrically connected to the second wire segment 22 to eliminate or suppress the static electricity generated by capacitive coupling effects formed between human bodies, devices, apparatuses, and/or circuits so as to reduce interference in the fingerprint detection signal Sfd and the fingerprint signal Sfp and increase the accuracy of fingerprint identification.

In conclusion, the present invention has following features and advantages:

1. The conductive wire can be arranged on the surface of the cover of the electronic apparatus without needing to open/dig a hole for embedding the fingerprint identification module to achieve the function of fingerprint identification, increase the correctness and security of fingerprint identification, and reduce manufacturing costs.

2. The conductive wire is placed on the surfaces of the cover of the electronic apparatus to contact the user's finger, so as to accurately sense the user's fingerprint and correctly identify the user's identity in the case of higher and increasing thickness of the protective glass, such as the cover glass placed on the electronic apparatus.

3. Both the on-chip fingerprint sensor structure and the off-chip fingerprint sensor structure can be implemented to increase the flexibility and adaptation of developing and/or using the fingerprint identification apparatus having the conductive structure.

4. The electricity elimination circuit is provided to eliminate or suppress the static electricity generated by capacitive coupling effects formed between human bodies, devices, apparatuses, and/or circuits so as to reduce interference in the fingerprint detection signal Sfd and the fingerprint signal Sfp and increase the accuracy of fingerprint identification.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A fingerprint identification apparatus having a conductive structure, the fingerprint identification apparatus comprising:
   an insulated casing, comprising:
      a first surface being an outer surface of the insulated casing, and the first surface having a fingerprint detection region; and
      a second surface being an inner surface of the insulated casing, and the second surface being opposite to the first surface;
   a conductive wire, comprising:
      a first wire segment disposed on the first surface and in contact with the fingerprint detection region; and
      a second wire segment disposed on the second surface and electrically connected to the first wire segment; and
   a fingerprint identification module disposed on the second surface without embedding in the insulated casing and electrically connected to the second wire segment.

2. The fingerprint identification apparatus in claim 1, wherein the insulated casing is a glass casing or a transparent polymer casing, and the conductive wire is a transparent conductive wire.

3. The fingerprint identification apparatus in claim 1, wherein the first wire segment is arranged around an outer edge or an inner edge of the fingerprint detection region.

4. The fingerprint identification apparatus in claim 1, further comprising:
at least one conductive member arranged between the first surface and the second surface of the insulated casing and electrically connected to the first wire segment and the second wire segment of the conductive wire.

5. The fingerprint identification apparatus in claim 4, wherein the at least one conductive member is a metal frame.

6. The fingerprint identification apparatus in claim 4, wherein the at least one conductive member is a conductive rubber or a conductive adhesive.

7. The fingerprint identification apparatus in claim 1, further comprising:
at least one through hole formed between the first surface and the second surface of the insulated casing; and
a conductive material filled in the at least one through hole and electrically connected to the first wire segment and the second wire segment of the conductive wire.

8. The fingerprint identification apparatus in claim 1, wherein the fingerprint identification module comprises:
a fingerprint identification integrated circuit having a reference potential contact;
wherein the reference potential contact is electrically connected to the second wire segment.

9. The fingerprint identification apparatus in claim 8, wherein the reference potential contact is a zero potential contact of the fingerprint identification integrated circuit or a predetermined direct-current voltage output point.

10. The fingerprint identification apparatus in claim 1, wherein the fingerprint identification module comprises:
a fingerprint identification integrated circuit; and
a plurality of sensing electrodes;
wherein the fingerprint identification integrated circuit is configured to provide a fingerprint detection signal, and the fingerprint detection signal is transmitted to a finger touching on the fingerprint detection region through the second wire segment and the first wire segment to produce a fingerprint signal from the finger; the fingerprint signal is sensed by the plurality of sensing electrodes.

11. The fingerprint identification apparatus in claim 1, wherein the fingerprint identification module comprises:
a fingerprint identification integrated circuit having a plurality of sensing electrodes;
wherein the fingerprint identification integrated circuit is configured to provide a fingerprint detection signal, and the fingerprint detection signal is transmitted to a finger touching on the fingerprint detection region through the second wire segment and the first wire segment to produce a fingerprint signal from the finger; the fingerprint signal is sensed by the plurality of sensing electrodes of the fingerprint identification integrated circuit.

12. The fingerprint identification apparatus in claim 1, wherein the fingerprint identification module comprises:
a fingerprint identification integrated circuit having a static electricity elimination circuit;
wherein the static electricity elimination circuit is electrically connected to the second wire segment.

13. The fingerprint identification apparatus in claim 1, wherein the fingerprint identification module is a capacitive fingerprint identification module.

14. The fingerprint identification apparatus in claim 13, wherein the fingerprint identification module comprises:
a plurality of sensing electrodes placed on a glass substrate or a polymer substrate.

15. The fingerprint identification apparatus in claim 14, wherein the glass substrate or the polymer substrate is the insulated casing.

16. The fingerprint identification apparatus in claim 1, wherein the insulated casing is an upper cover or a lower cover of an electronic apparatus.

* * * * *